July 2, 1935.   E. L. FIX ET AL   2,006,348
LAMINATED GLASS AND PROCESS OF MAKING THE SAME
Filed June 30, 1934
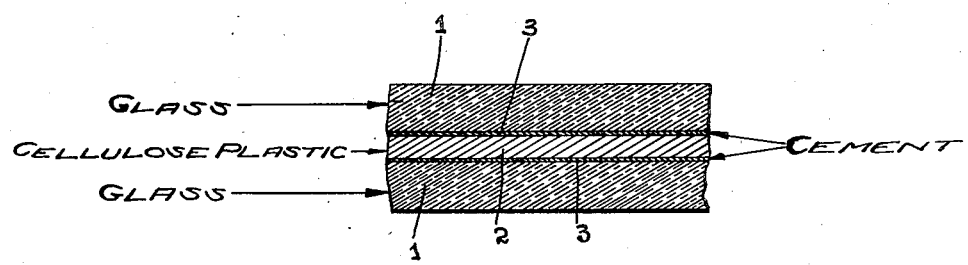
INVENTORS
EARL L. FIX and
JOHN C. ZOLA
BY
ATTORNEYS Patented July 2, 1935

2,006,348

UNITED STATES PATENT OFFICE 2,006,348

LAMINATED GLASS AND PROCESS OF MAKING THE SAME

Earl L. Fix, New Kensington, Pa., and John C. Zola, Detroit, Mich., assignors to Duplate Corporation, a corporation of Delaware Application June 30, 1934, Serial No. 733,256

10 Claims. (Cl. 49—81)

The invention relates to laminated glass which ordinarily consists of two sheets of glass cemented to the opposite sides of a sheet of cellulose plastic. Very considerable difficulty is encountered in cementing glass to cellulose acetate, ethyl cellulose, and to cellulose nitrate when the latter contains a high percentage high boiling plasticizer, and the invention is directed primarily to use with these plastics, and constitutes in part a division of our application, Serial No. 665,549, filed April 11, 1933. The objects of the invention are the provision of a process and cementing medium, (1) which can be used under ordinary compositing conditions, namely at temperatures ranging from 240 degrees to 275 degrees F.; (2) which will give a product that, under break tests, show results comparable with those now secured when ordinary cellulose nitrate is laminated using gelatin as a cement; and (3) which shows good adhesion under continued exposure tests, such as are recognized and established in the art. A plate of laminated glass made in accordance with the invention is shown in the accompanying drawing, wherein:

The figure is a sectional view through the plate.

In the drawing, 1, 1 are sheets of glass; 2 is a sheet of cellulose plastic; and 3, 3 are layers of the cementing medium.

Briefly stated, the invention involves the use of a compound of boron, such as boric acid in solution with an alkaline metal salt, such as sodium silicate. The boron compounds used have on ordinary examination little or no stickiness, but when compounded with the sodium silicate or other alkaline metal salt, they add greatly to their adhesive strength. The alkaline salts, such as sodium silicate, are well known adhesives and will adhere cellulose plastic to glass with a fairly good bond for a short time, but fail as commercial adhesives for safety glass because the bond soon weakens, so that separation occurs, and the glass soon loses a large part of its safety factor. The addition of the boron compound entirely overcomes this weakness, so that permanent and very secure adhesion is secured as evidenced by break tests after long periods of use and by roof exposure.

A specific example of the cement as used with cellulose nitrate, cellulose acetate, and ethyl cellulose is as follows:

| | Grams |
|---|---|
| Boric acid | 1 |
| Sodium silicate | 0.25 |
| Water | 98.75 |

In compositing, the mixture is placed on the glass sheets in a thin film, preferably by spraying, and allowed to dry, after which the glass sheets are applied to the cellulose plastic sheet and a lamination is secured in the usual way by the application of heat and pressure, preferably by the hydraulic method of the Sherts and Hamill Patent No. 1,181,084, the pressure employed in the final pressing being about 150 pounds per square inch, and the temperature being about 240 degrees F.

Other examples of the cement found satisfactory are as follows:

| | Grams |
|---|---|
| Boric acid | 1 |
| Sodium stannate | 0.25 |
| $H_2O$ | 100 |

| | Grams |
|---|---|
| Boric acid | 0.25 |
| Sodium stannate | 0.75 |
| Sodium silicate | 0.25 |
| $H_2O$ | 100 |

| | Grams |
|---|---|
| Boric acid | 0.75 |
| Sodium aluminate | 0.15 |
| Sodium silicate | 0.25 |
| $H_2O$ | 100 |

| | Grams |
|---|---|
| Ammonium borate | 1 |
| Sodium silicate | 0.5 |
| $H_2O$ | 100 |

| | Grams |
|---|---|
| Sodium borate | 1 |
| Sodium silicate | 0.5 |
| $H_2O$ | 100 |

| | Grams |
|---|---|
| Potassium tetraborate | 1 |
| Sodium stannate | 0.25 |
| $H_2O$ | 100 |

What we claim is:

1. A method of compositing a sheet of cellulose plastic with a glass sheet which comprises the step of coating the face of the glass sheet with a solution of a boron compound and an alkaline metal salt, assembling the sheets and applying heat and pressure.

2. A method of compositing a sheet of cellulose plastic with a glass sheet which comprises the step of coating the face of the glass sheet with a mixture consisting of a boron compound and an alkaline metal salt in solution in water, assembling the sheets and applying heat and pressure.

3. A method of compositing a sheet of cellulose plastic with a glass sheet which comprises the step of coating the face of the glass sheet with a mixture consisting of a boron compound and a silicate in solution in water, assembling the sheets and applying heat and pressure.

4. A method of compositing a sheet of cellulose plastic with a glass sheet which comprises the step of coating the face of the glass sheet with a mixture consisting of boric acid and an alkaline metal salt in solution in water, assembling the sheets and applying heat and pressure.

5. A laminated plate comprising a pair of glass sheets cemented to the opposite sides of a sheet of cellulose plastic with a cement comprising a boron compound and an alkaline metal salt.

6. A laminated plate comprising a pair of glass sheets cemented to the opposite sides of a sheet of cellulose plastic with a cement comprising a boron compound and a silicate.

7. A laminated plate comprising a pair of glass sheets cemented to the opposite sides of a sheet of cellulose plastic with a cement comprising a boron compound and sodium silicate.

8. A laminated plate comprising a pair of glass sheets cemented to the opposite sides of a sheet of cellulose plastic with a cement comprising boric acid and a salt of an alkaline earth metal.

9. A laminated plate comprising a pair of glass sheets cemented to the opposite sides of a sheet of cellulose plastic with a cement comprising boric acid and a silicate.

10. A laminated plate comprising a pair of glass sheets cemented to the opposite sides of a sheet of cellulose plastic with a cement comprising boric acid and sodium silicate.

EARL L. FIX.
JOHN C. ZOLA.